United States Patent [19]

Fujita et al.

[11] Patent Number: 4,931,828
[45] Date of Patent: Jun. 5, 1990

[54] READER-PRINTER

[75] Inventors: Masafumi Fujita; Takao Saijo; Kazuhiko Tezuka, all of Osaka, Japan

[73] Assignee: Minolta Camera Kabushiki Kaisha, Osaka, Japan

[21] Appl. No.: 285,844

[22] Filed: Dec. 16, 1988

[30] Foreign Application Priority Data

Dec. 18, 1987 [JP] Japan ................................ 62-322263
Dec. 18, 1987 [JP] Japan ................................ 62-322264

[51] Int. Cl.$^5$ ............................................. G03B 13/28
[52] U.S. Cl. ............................................. 355/45; 355/68
[58] Field of Search ................ 355/43, 45, 41, 68; 250/571

[56] References Cited

U.S. PATENT DOCUMENTS 4,589,767 5/1986 Yanagi et al. ........................ 355/45
4,738,523 4/1988 Ito et al. ............................. 355/45

FOREIGN PATENT DOCUMENTS 59-30550 2/1984 Japan .
60-101527 6/1985 Japan .
61-165746 7/1986 Japan .

Primary Examiner—L. T. Hix
Assistant Examiner—D. Rutledge
Attorney, Agent, or Firm—Willian Brinks Olds Hofer Gilson & Lione

[57] ABSTRACT

A reader-printer with an image size judging function, which has a plurality of sensors for judging a size of a desired image retrieved out of a multiplicity of images recorded on a microfilm. These sensors are arranged along a film transport direction to allow them to have a predetermined detection area.

12 Claims, 12 Drawing Sheets

A3 retracted position tb  ta

A4 left half copy tb  ta

A4 center copy tb  ta

READER-PRINTER

BACKGROUND OF THE INVENTION (1) Field of the Invention

The present invention relates to a reader-printer, particularly to a reader-printer with an image size judging function.

(2) Description of the Prior Art

On a microfilm, images of different sizes, for example, A3 size and A4 size, are recorded in the same magnification. In printing an image recorded on such a microfilm, it is necessary to select a paper feeding cassette of a size of the image. This requires judgment of the image size.

A conventional reader-printer with an image size judging function is disclosed in Japanese Patent Publication Kokai No. 61-165746. This reader-printer utilizes the transparency difference between an image and a blank portion present between the adjacent frame images. It also utilizes the difference between the position of the blank portion when a small size (for example, A4 size) frame image is at an exposure position and that when a large size (for example, A3 size) frame image is at the exposure position. A sensor is provided to detect the blank portion, for example, when the small size frame image is at the exposure position. Accordingly, when the sensor detects the blank portion, the image is judged to be of small size, and when not, the image is judged to be of large size, which enables selection of a paper feeding cassette.

This type of reader-printer, however, has the following problems.

That is, in retrieving frame images, positions at which the blank portion is stopped is subtly varied since a film carrier does not always stop at exactly the same position, even if all the images are of the same size. Therefore, in order to enable detection of the blank portion regardless of the various stopping positions, the image size judging sensor is required to have a large detection area. However, width of the blank portion is not fixed and high detection accuracy cannot be obtained in detection of the narrow blank portion, apart from the case of the wide blank portion. This may cause an incorrect judgment.

Further, the image size judgment must be made prior to a printing operation because it is utilized in selecting a paper feeding cassette. In order to meet this requirement, the judgment may be made in the reader mode. However, this entails the problem that the shadow of the sensor is seen on the screen when the sensor is illuminated by light.

SUMMARY OF THE INVENTION

A primary object of the present invention, therefore, is to provide a reader-printer capable of detecting a narrow blank portion even if the detection area is large and of judging an image size accurately.

A second object of the present invention is to provide a reader-printer capable of judging an image size prior to a printing operation without a shadow of a sensor falling on the screen.

The above primary object is fulfilled according to the present invention by a reader-printer comprising a plurality of paper feeding sections, each accommodating a recording paper of a different size; retrieval means for retrieving a desired image out of a multiplicity of images recorded on a microfilm; a plurality of sensors arranged in a line along a film transport direction for judging a frame size of the retrieved image, the plurality of sensors being disposed in a position where all the sensors receive light having passed through an image area when an image at an exposure position has a first size, and where at least one sensor receives light having passed through an area including a blank portion between images when the image has a second size; distinguishing means for distinguishing signals of levels corresponding to the blank portion from signals of other levels, both of the signals being generated by the plurality of sensors; and control means for judging a size of the retrieved image frame using a result of the distinguishing means and selecting a paper feeding section out of the plurality of paper feeding sections in accordance with a result of the judgment.

Each sensor may have the same or less width than a width of the blank portion projected onto the sensor.

Each sensor may have the same or less width than a half of the width of the blank portion projected onto the sensor.

An arrangement pitch of each sensor may be the same or less than the width of the blank portion projected onto the sensor.

The arrangement pitch of each sensor may be the same or less than a half of the width of the blank portion projected onto the screen.

The reader-printer may have a plurality of transverse rows of sensors.

According to the above construction, since a plurality of sensors for judging a frame size of an image are arranged along a film transport direction, the sensors have a large detection area as a whole in the transport direction even if the detection area of each sensor is small. Therefore, whether the blank portion is present or not can be accurately detected although the film stopping position is varied in the frame retrieval. In addition, when the blank portion is within the detection area, it can be detected insofar as its width is large enough to be detected by one sensor.

The above second object is fulfilled according to the present invention by a reader-printer comprising retrieval means for retrieving a desired image out of a multiplicity of images recorded on a microfilm; judgment means for judging a frame size of the retrieved image during a change-over operation from the reader mode to the printer mode; and control means for controlling the operation in the printer mode to effect a paper feeding operation by selecting a paper feeding section out of a plurality of sections on the basis of a result of the judgment.

The sensor may be disposed on an extension line of a projecting optical path of a film projecting lens and in a position which light having passed the microfilm reaches during the period from output of a print starting signal to scan start of a scanning mirror.

The sensor may receive the light having passed the film when an optical path changeover mirror for changing over between a reader optical path in the reader mode and a printer optical path in the printer mode is moved to a printer mode position.

The above objects are fulfilled also by a reader-printer comprising a plurality of paper feeding sections, each accommodating a recording paper of a different size; retrieval means for retrieving a desired image out of a multiplicity of images recorded on a microfilm; a plurality of sensors arranged in a line along a film transport direction for judging a frame size of the retrieved image, the plurality of sensors being disposed on an extension line of a projecting optical path of a film projecting lens in a position which light having passed a microfilm reaches during the period from output of a print starting signal to scan start of a scanning mirror, the light passing through an image area when an image at an exposure position has a first size, and passing through an area including a blank portion between images when the image has a second size; distinguishing means for distinguishing signals of levels corresponding to the blank portion from the signals of other levels, both of signals being generated by the plurality of sensors; and control means for judging a size of the retrieved image frame using a result of the distinguishing means and selecting a paper feeding section out of the plurality of paper feeding sections in accordance with a result of the judgment.

According to the above construction, the sensor is illuminated by light having passed the microfilm during the period after the output of a print starting signal before the scan start of the scanning mirror. At this time, the reader mirror is retracted outside the projecting optical path. This prevents the shadow of the sensor from falling on the screen. Since the sensor is illuminated by the light before the scanning mirror starts to scan, the judging result can be utilized in the subsequent printing operation. This results in that the speed of a first copy is hardly reduced and that an optimum auto exposure photometric area and optimum mirror movement can be provided in accordance with the image size.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 1:
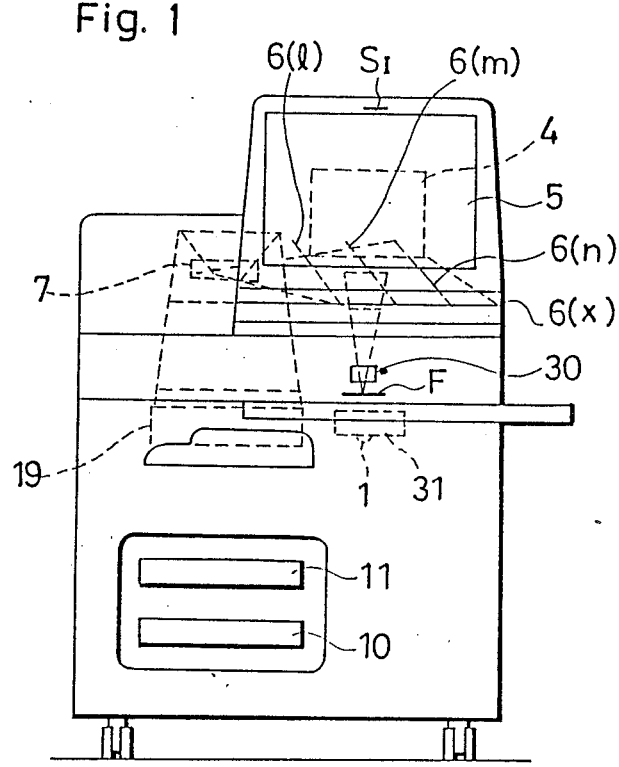
FIG. 1 is a front view of a reader-printer which is one example of the present invention.

An embodiment of the present invention will be described hereinafter referring to the drawings.

Figure 2:
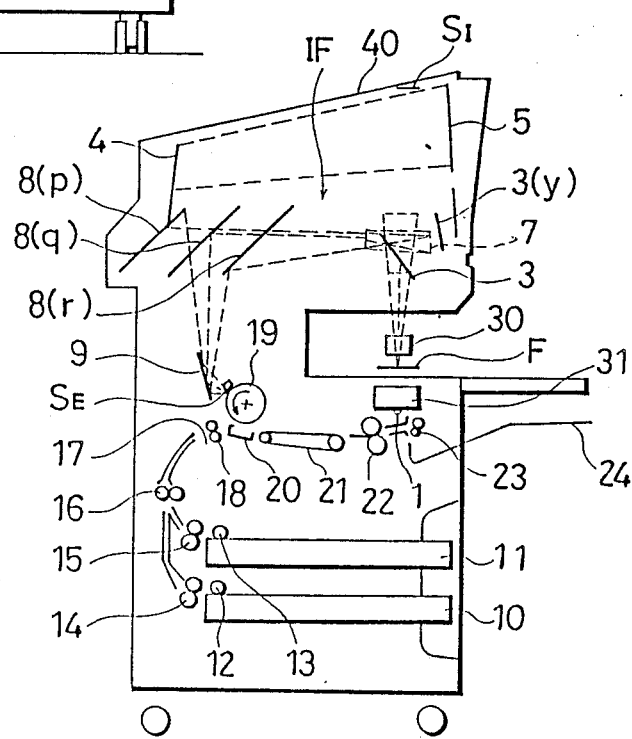
FIG. 2 is a cross section thereof.

FIG. 1 and FIG. 2 are a front view and a cross section of a reader-printer with an image size judging function according to the present invention.

This reader-printer can be changed over between a reader mode in which an image on a microfilm is projected on a screen and a printer mode in which the image is printed on a recording paper.

In the reader mode, scanning mirror 6 for copying is retracted at the position x indicated by a broken line in the drawings. Light from a light source 1 provided below the film F passes through a condenser lens 31 and illuminates the film F, whereby the image recorded therein is projected in magnification onto the screen 5 through a lens 30 and mirrors 3 and 4. In the printer mode, a projecting mirror 3 is retracted at a position y outside a image-forming optical path. Therefore, the light from the light source is slit-exposed onto an uniformly charged photosensitive drum 19 through scanning mirrors 6, 8 and fixed mirrors 7, 9. Thus, a magnified frame image, that is to say, an electrostatic latent image is formed on the photosensitive drum 19. The scanning mirrors 6 and 8 are connected to each other by a wire (not shown) to be moved integrally. In a copying operation, after being moved to scan starting positions and p, the scanning mirrors 6 and 8 effect a scanning operation toward scan ending positions n and r.

In the printer mode, when a print switch (not shown) is turned on, a pickup roller 12 or 13 rotates and, as will be described later, a recording paper having a size corresponding to the frame size of the image on the film F is fed from a paper feeding cassette 10 or 11. The paper feeding cassettes 10 and 11 accommodate recording papers of two different sizes A3 and A4, respectively. Then, the paper is transported to a timing roller 18 by a pair of rollers 14, 16 or 15,16. After the timing roller receives the paper, a paper detecting sensor 17 detects a leading end of the paper, whereby driving of the timing roller 18 is stopped. At the same time, as described above, the scanning mirrors 6 and 8 start to scan to form the latent image on the photosensitive drum 19. This latent image is developed by adhering toner powders thereto and is transferred onto the recording paper fed by the timing roller 18 by a transferring device 20. The recording paper having been subjected to the transference is transported by a transporting device 21. Thereafter, the transferred image is fixed by a heat-fixing device 22 to be delivered onto a tray 24 by a delivery roller 23.

Figure 3A:
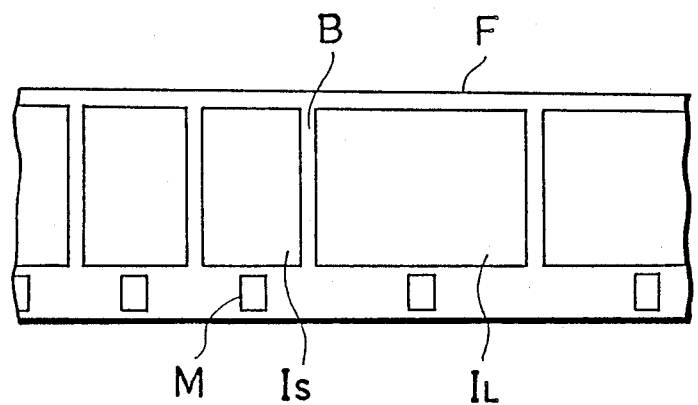
FIGS. 3a and 3b are plan views of a microfilm.
Figure 3B:
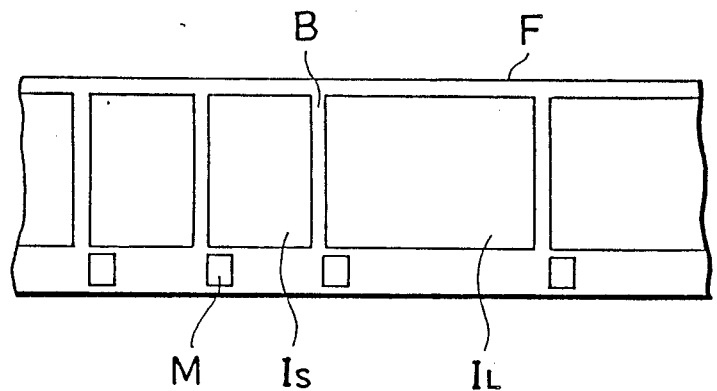

Next, a microfilm to be loaded on the reader-printer will be described. As shown in FIGS. 3a and 3b, the microfilm F comprises a long film having a width of 16 mm or 35 mm in which multiple images of two sizes $I_S$ and $I_L$ are recorded in the form of mixture. These two sizes correspond to original documents of two different sizes A3 and A4, respectively. In a bottom margin of this microfilm F, a mark M for retrieving a frame of the image I (so called document mark) is recorded for each image. The position at which the mark M is to be recorded is determined according to either of the following two methods. According to the first method, as shown in FIG. 3a, the mark is provided at a position corresponding to the center of each microimage. According to the second method, as shown in FIG. 3b, the mark is provided at a position corresponding to the leading end of each microimage In addition, the microfilm reader-printer has a sensor $S_M$ so that it corresponds to the mark M. (Refer to a broken line in FIG. 6.) Each time the sensor $S_M$ detects the mark M during transportation of the film F, a counter (not shown) is counted up, whereby it is possible to project a microimage I in a desired frame onto the screen 5 according to a frame number designated by an operator.

Figure 4A:
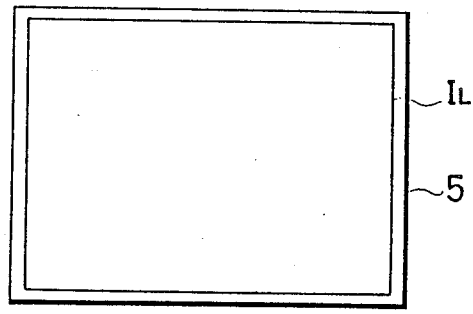
FIGS. 4a through 4c are front views showing projecting conditions of a microimage on a screen.
Figure 4B:
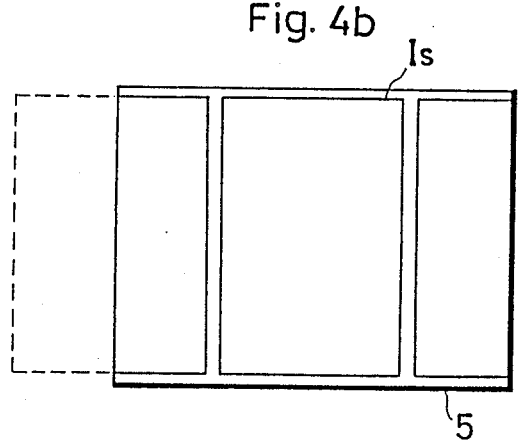
Figure 4C:
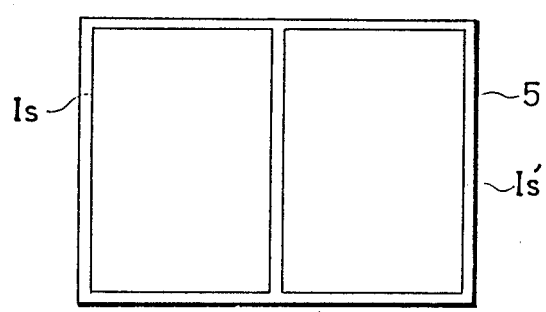
Figure 5:
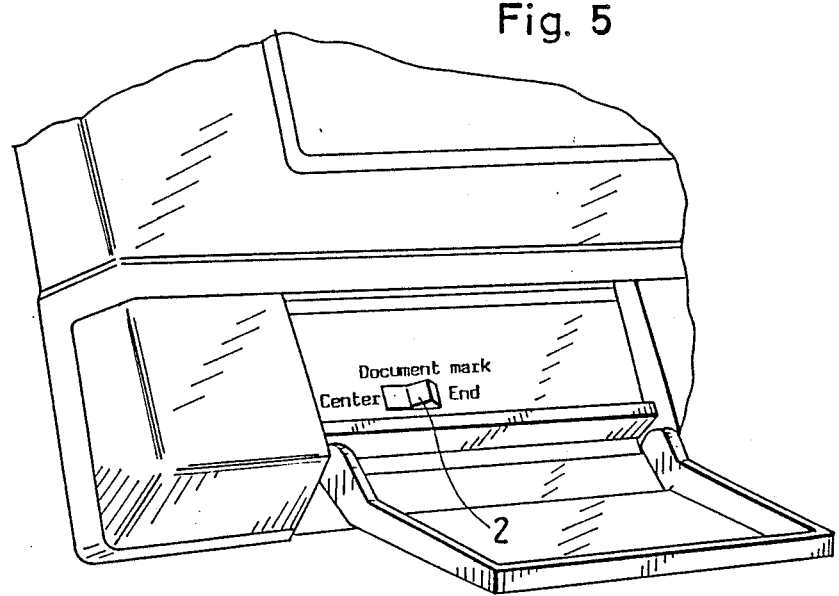
FIG. 5 is a perspective view showing a mounting portion for mounting a document mark/recording paper size selecting switch.
Figure 6A:
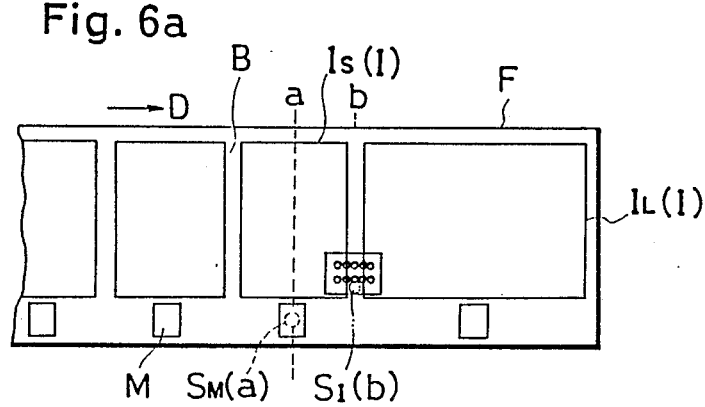
FIGS. 6a through 6d are plan views showing a positional relationship between an image size judging sensor and the microfilm.
Figure 6B:
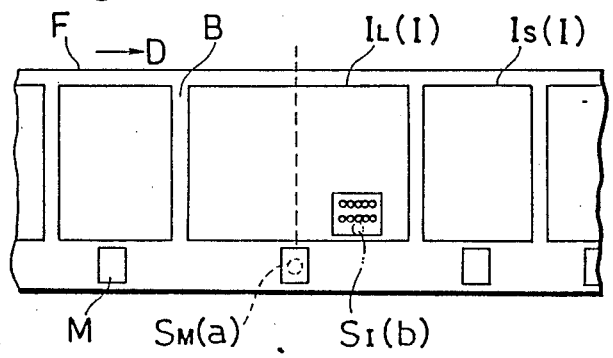
Figure 6C:
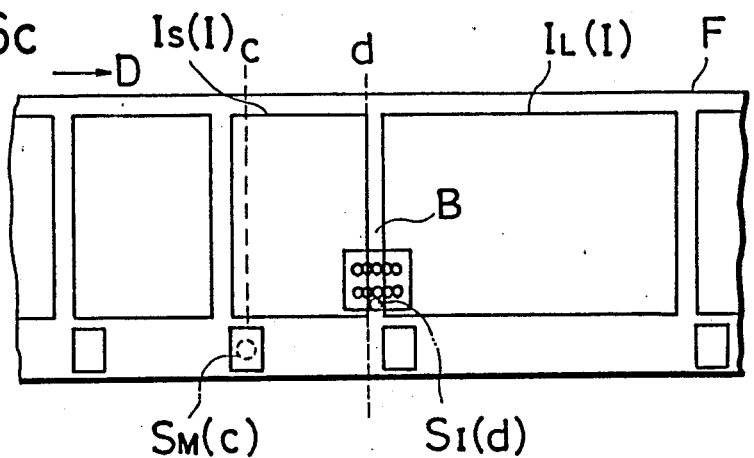
Figure 6D:
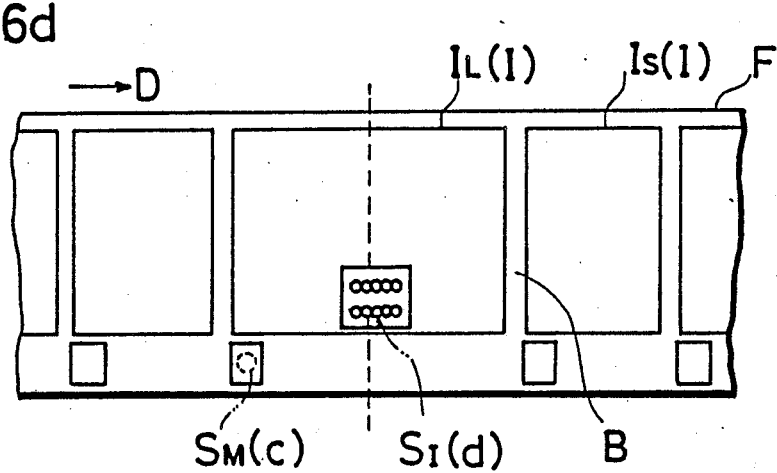

Whichever method is employed in recording the document mark M, the transportation of the film F is stopped so as to position the desired frame at the exposure position by means of detection of the document mark M by the sensor $S_M$. The sensor $S_M$ is disposed in such a manner that the image I projected onto the screen 5 is positioned correctly at that time. Thus, the sensor $S_M$, in the reader mode, acts as a sensor for positioning a projected image. The position of the sensor $S_M$ in the first method corresponds to, as shown in FIGS. 6a and 6b, the center of the screen 5 and, when the positioning is effected by use of a detection result by this sensor, a microimage $I_L$ of A3 size and a microimage $I_S$ of A4 size are projected onto the screen as shown in FIGS. 4a and 4b, respectively. The position of the sensor $S_M$ in the second method corresponds to, as shown in FIGS. 6c and 6d, the leading end of the film transport direction and, when the positioning is effected by use of a detection result by this sensor, a microimage $I_L$ of A3 size and a microimage $I_S$ of A4 size are projected onto the screen as shown in FIGS. 4a and 4c, respectively. The detection sensor $S_M$ can be changed over between these two positions, as shown in FIG. 5, by operating a document mark selecting switch provided in a front face of the printer.

In addition to the above document mark detecting sensor, the reader-printer includes an image size judging sensor $S_I$, an auto exposure (AE) photometric sensor, $S_E$ and a scan starting sensor not shown.

The image size judging sensor $S_I$ is disposed on a ceiling 40 of the reader-printer right above the projecting lens 30. More particularly, the sensor $S_I$ is placed at the position where the image is projected when the image is of A3 size, and the blank portion is projected when the image is of A4 size, after the retrieval is completed to stop the film and the mirror 3 is retracted. The sensor $S_I$ provided at such a position is prevented from being illuminated by the light having passed the microfilm in the reader mode because the projecting mirror 3 is right above the projecting lens 30. In the printer mode also, the scanning mirror 6 for copying scans above the projecting lens 30 during the printing operation, which prevent the light having passed the microfilm from reaching the sensor $S_I$. At the time of print starting, however, the projecting mirror 3 is retracted to a retracted position y and the scanning mirror 6 is not placed above the projection lens 30, thereby allowing the transmitted light to reach the sensor $S_I$. The image size can be judged during this period.

The relative position between the sensor $S_I$ and the document mark detecting sensor $S_M$ is shown in FIG. 6 in detail. As seen from FIGS. 6a and 6b, in the case where the document mark detecting sensor $S_M$ is at the position corresponding to the center a of the screen 5, the sensor $S_I$ is positioned at $S_{I(b)}$ in the drawings. As seen from FIGS. 6c and 6d, in the case where the document mark detecting sensor $S_M$ is at the position corresponding to the leading end c of the film transport direction, the sensor $S_I$ is positioned at $S_{I(d)}$ in the drawings. In either case, sensors $S_{I(b)}$ and $S_{I(d)}$ are provided in such a manner that when a small size image $I_S$, for example A4 size image, is retrieved to be stopped at the exposure position, a blank portion B of one side of the image can be detected. Therefore, when a large size image $I_L$ is stopped at the exposure position, as shown in FIGS. 6c and 6d, the sensors $S_{I(b)}$ and $S_{I(d)}$ detect the image. The sensors $S_{I(b)}$ and $S_{I(d)}$ can be changed over between these positions maintaining the above relative position at the same time as the position of the document mark detecting sensor $S_M$ is changed over by the document mark selecting switch 2.

Figure 7:
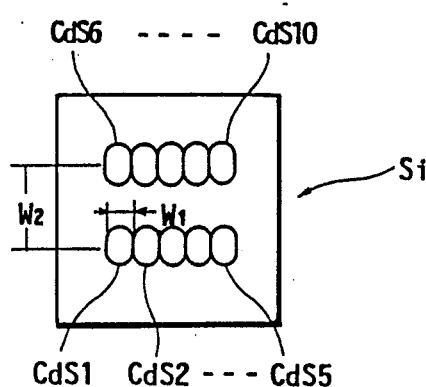
FIG. 7 is a plan view of the image size judging sensor.

The sensor $S_I$ comprises two transverse rows of a plurality of light receiving elements (five in this embodiment) such as CdS arranged along the film transport direction (referred to as transport direction hereinafter). The light receiving elements CdS1, CdS2, ... in each row are arranged closely without intervals so that they have uniform detection output wherever the blank portion is present. In this embodiment, each light receiving element has a width W1 of 3.5 mm which corresponds to 7 mm on the screen. One light receiving element must theoretically have the same or less width than the minimum width of the blank portion, preferably the same or less than half the width of the blank portion. The width of the blank portion referred to herein is measured on the condition that it is projected onto the sensor. In fact, however, even if the width W1 of the light receiving element is 7 mm on the screen, a blank portion having a width of 6 mm on the screen can be detected by setting the threshold value, which is a border between the blank portion and the image, as low as possible (to such a degree that a large size image can be distinguished from a small size image). The number of the light receiving elements to be arranged in the transport direction must be enough to have a detection area within which the blank portion is placed regardless of nonuniformity of stopping positions at the time of retrieval end. In this embodiment, five light receiving elements are employed. Although, in FIG. 7, the light receiving elements CdS1, CdS2, ... are arranged without intervals, they may be arranged at appropriate intervals. This is because the relationship between the width W1 of the CdS and the width of the blank portion depends on pitches. The reason why the plurality of light receiving elements are arranged in rows in the transverse direction, i.e., the direction perpendicular to the transport direction, is as follows. If the right receiving elements are arranged in one row, there is high probability of mistaking a transparent portion scattered in the image for the blank portion. On the other hand, if two or more rows are provided, since at least one row is out of the transparent portion, it is possible to make the probability extremely low by finding a logical product of light receiving element outputs of all row. In this embodiment the right receiving elements are arranged in two rows because three or more rows cost much. The space W2 between each row must be determined so that two rows should not be within one transparent portion of the image and inclination of the film should not impede the detection of the blank portion. In this embodiment, the space W2 has a width of 10 mm. If the light receiving elements having a large detection area in the transverse direction are employed, they can be arranged in one row which is enough to meet the above condition.

Figure 8:
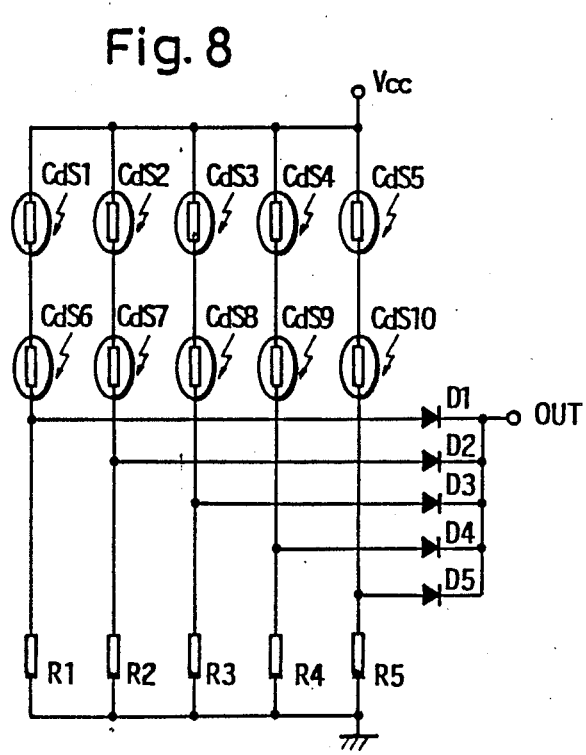
FIG. 8 is a circuit diagram showing a circuit for receiving a detection signal from the above sensor.

FIG. 8 shows a circuit for distinguishing the blank portion from the image with the sensor having a construction in which two rows of five light receiving elements are arranged. The opposed pairs of light receiving elements are connected in series to be connected to one ends of fixed resistances R1-R5. The other ends of the fixed resistances R1-R5 are connected to output terminal OUT through diodes D1–D5. According to this circuit, if the blank portion is detected by any one of the light receiving elements, the terminal voltage of the fixed resistance connected to the light receiving elements rises and the voltage value is output to the output terminal OUT. This output value is read into a CPU inside a control device through an A/D converter not shown. In the CPU, this output value is compared with the threshold value stored in a memory. If the output value is greater than the threshold value (that is, the quantity of light received by the sensor is greater), the blank portion has been sensed. Therefore, the image is judged to be of A4 size. In contrast, if the output value is smaller than the threshold value, the image is judged to be of A3 size. Although there are various methods for determining the threshold value, in this embodiment a method is employed in which the quantity of light in the absence of an image is measured by providing a function key operable by a service man and illuminating the sensor by light having passed an optical system. Then, half the value obtained is stored in a RAM area (not shown) as the threshold value. This method is advantageous as compared with a method in which the value is set by using a trimmer capacitor because the threshold value can be set taking into consideration sensitivity differences between sensors and light quantity between optical systems of equipment. In this case, the RAM must comprise a non-volatile memory. The half value mentioned above is symbolic and the threshold value is to be set at an optimum value for each system in accordance with image pattern and image density.

Although the image projected to the image size judging sensor $S_I$ through the projecting lens 30 is not focused, this is not obstructive to the judgment because the blank portion B and the image I have different quantities of transmitted light.

In FIG. 8, the maximum value of the detected quantity of light is obtained by a circuit. It may also be possible to find the maximum value at the side of a software after reading the value by connecting the terminal voltage of each fixed resistance individually to the A/D converter after the value is read into the CPU.

Figure 9A:
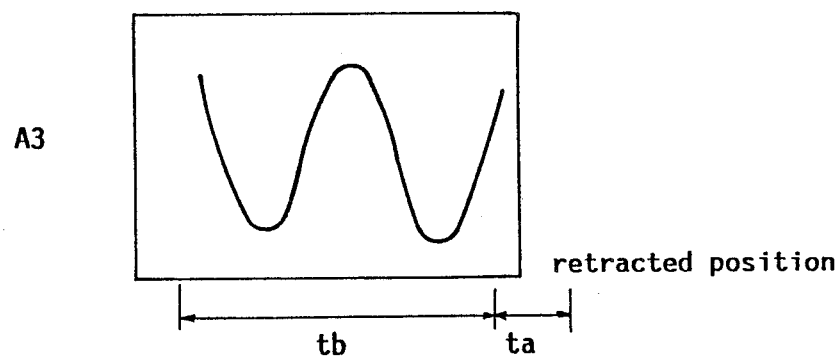
FIGS. 9a through 9c are explanatory views of a photometric operation of an AE sensor.
Figure 9B:
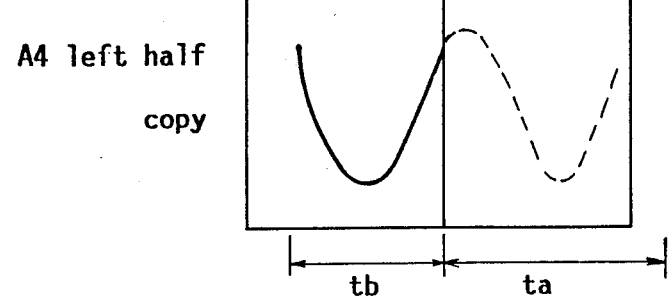
Figure 9C:
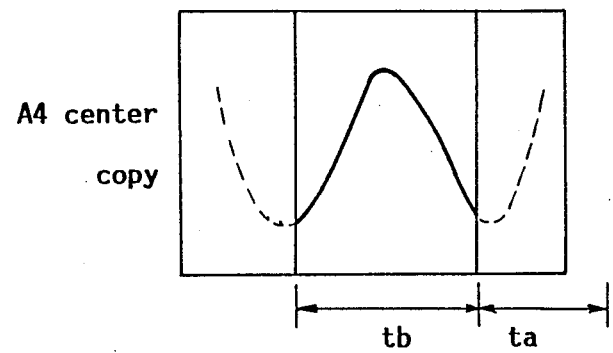

The AE sensor $S_E$ is provided near the photosensitive drum 19 as shown in FIG. 1. The photometric trace of the sensor $S_E$ is winding as indicated by a solid line in FIG. 9. The photometric area is determined by a timer in accordance with the image size and copying position, as shown in FIGS. 9a through 9c. The image-forming areas shown in FIGS. 9a, 9b and 9c corresponds to the copying of an A3 size image, of a left-half A4 size image, and of a central A4 size image, respectively. The time required for movement of the scanning mirror from the retracted position x to the photometry starting position in each case is set in the timer as ta1, ta2 and ta3 and the time required for passing through the photometric area is set as tb1, tb2 and tb3. Since the photometry is effected after completion of the image size judging operation, a desired time is selected in accordance with the image size obtained in the operation.

In the printer mode, on the basis of the result of the size judgment, the photometric area is selected and at the same time, the pickup roller 12 or 13 is selectively rotated to feed a correct size recording paper from the paper feeding cassette 10 or 11 to the transferring device 20.

That is, in the printer mode, after the image size is judged, the corresponding recording paper is fed to the timing roller 18. Then, rotation of the timing roller 18 is stopped. At this time, the scanning mirrors 6 and 8 start to move from the scan starting positions p and p, and at the same time, the timer T1 or T2 incorporated in the control device starts to operate. And the timing roller 18 is rotated again to feed the recording paper to the transferring device 20 after waiting for the predetermined time in order to synchronize the recording paper with the image formed on the photosensitive drum 19 according to the selection by the document mark selecting switch 2.

Figure 10A:
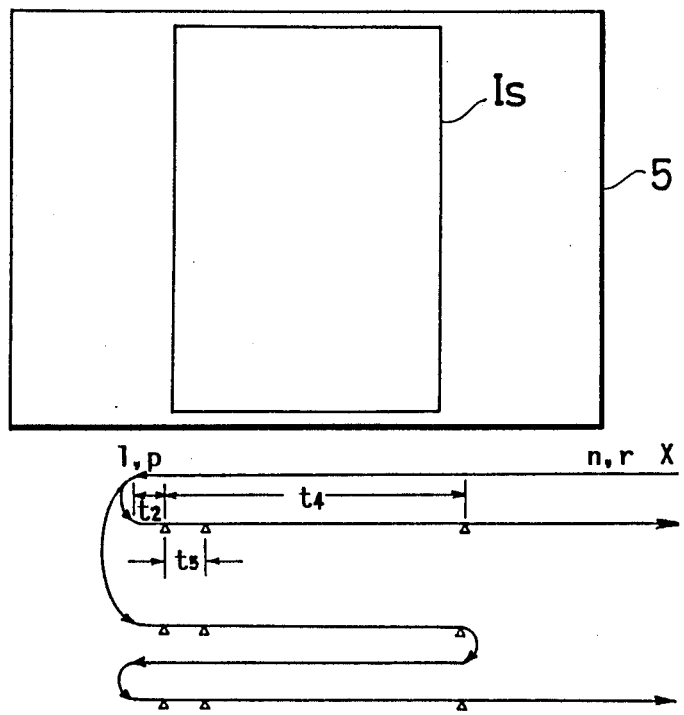
FIGS. 10a through 10c are explanatory views showing a relationship between the projected position of the microfilm on the screen and a set time of a paper feeding control timer.
Figure 10B:
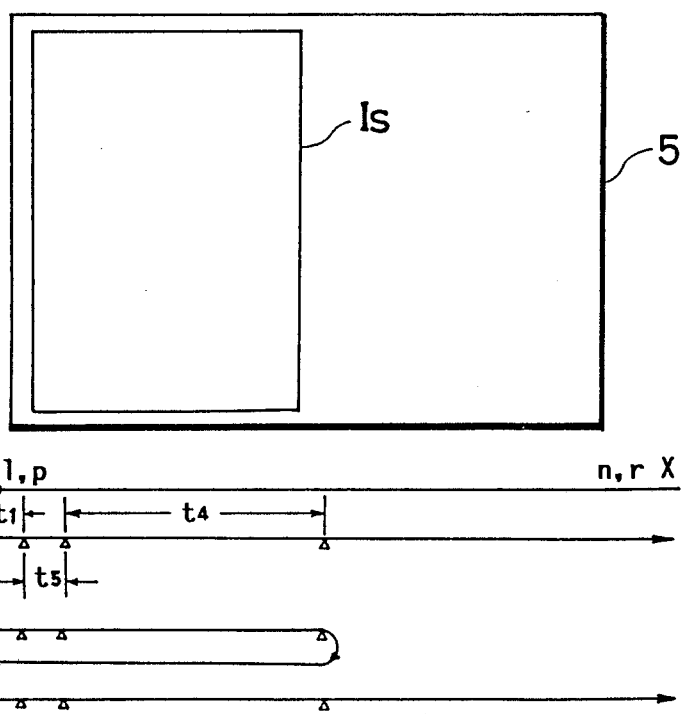
Figure 10C:
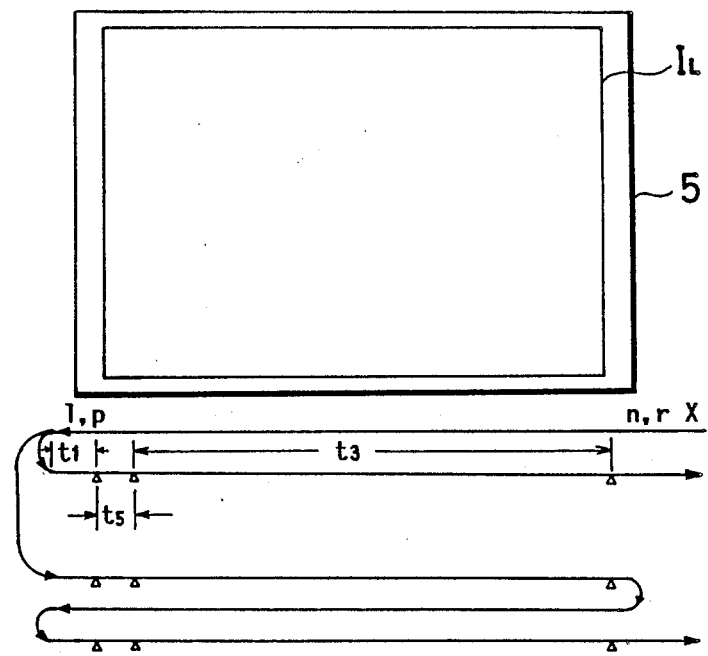

A relationship between the above set time and the position of the microimage I on the screen 5 is shown in FIGS. 10a through 10c. FIG. 10a shows the copying operation of the A4 size microimage $I_S$ in the case where the timer corresponding to the first method in which the document mark M is recorded at the center is selected. After the scanning mirror 6 is moved from the scan retracted position x to the scan starting position p, the scanning mirrors 6 and 8 start to scan and the timer T2 is started. The time required to move the scanning mirrors 6 and 8 to the leading end of the A4 size microimage $I_S$ projected onto the center of the screen 5 is a set time t2 of the timer T2. Further, the time lag between an image-forming start and an operation start of the timing roller 18 is a set time t5 of the timer T5. Therefore, when the time corresponding to t2 t5 has passed since the scan starting time, the recording paper is fed to the transferring device 20 to be subjected to an appropriate transference.

In copying only one paper, the scanning mirror 6 is retracted to the retracted position x after the A4 size micro image $I_S$ is formed on the photosensitive drum 19. In copying a plurality of papers, after the time t4 required to form the A4 size image $I_S$, the scanning mirrors 6 and 8 return to the scan starting positions and p to carry out the same operation as above. After copying operation of a designated number of papers are completed, the scanning mirror 6 is moved to the scan retracted position x.

FIG. 10b shows the copying operation of the A4 size microimage $I_S$ in the case where the timer corresponding to the second method in which the document mark M is recorded at the end is selected. In this case, the time required to move the scanning mirrors 6 and 8 from the scan starting positions and p to the leading end of the A4 size microimage $I_S$ projected on the leading end of the film transport direction is a set time t1 of the timer T1. Other operations are the same as those shown in FIG. 10a. Therefore, the recording paper is fed to the transferring device 20 when the time corresponding to t1 t2 has passed since the scan starting time.

FIG. 10c shows the copying operation of the A3 size microimage $I_S$. The operations in this case are the same as those shown in FIG. 10b except that the time required to form the A3 size image $I_S$ on the photosensitive drum 19 is t3.

Figure 11:
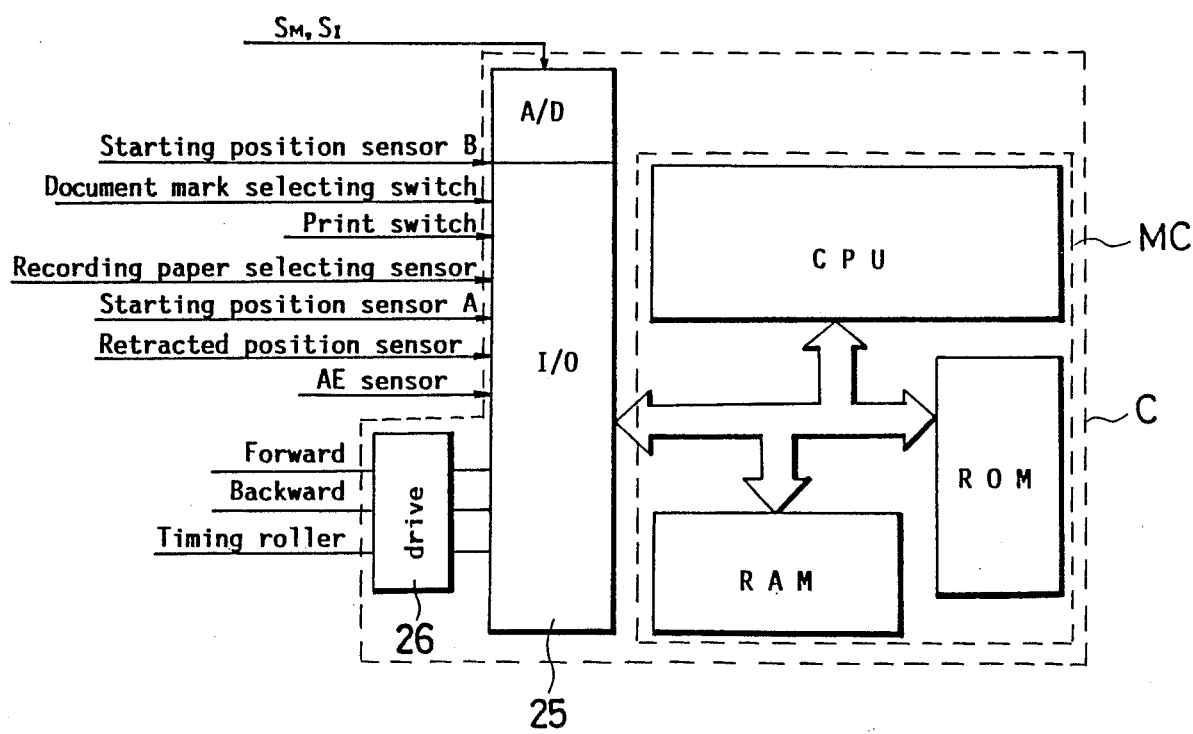
FIG. 11 is a schematic view of a control device for the microfilm reader-printer.

The control device for controlling the operations in the printer mode will be described hereinafter. As shown in FIG. 11, the control device C mainly comprises a microcomputer MC. An I/O interface 25 for this microcomputer receives through the A/D converter the signals from the document mark selecting switch 2, print switch, the recording paper selecting sensor 17 provided behind the timing roller 18, scan starting position sensors A and B for detecting whether the scanning mirrors 6 and 8 are at the scan starting positions p and p, the scan retracted position sensor for detecting whether the scanning mirror 6 is at the scan retracted position x, and a pair of sensors $S_M$ and $S_I$. The I/O interface 25 outputs through a driving circuit 26 a signal for driving the scanning mirrors 6 and 8 in forward and backward directions and a signal for controlling the driving of the timing roller 18. In this embodiment, two scan starting position sensors A and B are provided. One scan starting position sensor A is disposed at the same position as a conventional one, i.e., left end in FIG. 10c. The other sensor B is disposed at the position slightly over the starting position in FIG. 10a in the backward scanning direction. These two sensors A and B allow the optimum scan driving distance.

Next, the printing operation of a microfilm reader-printer having a construction as described above will be explained referring to flowcharts shown in FIG. 12 through FIG. 15.

Figure 12:
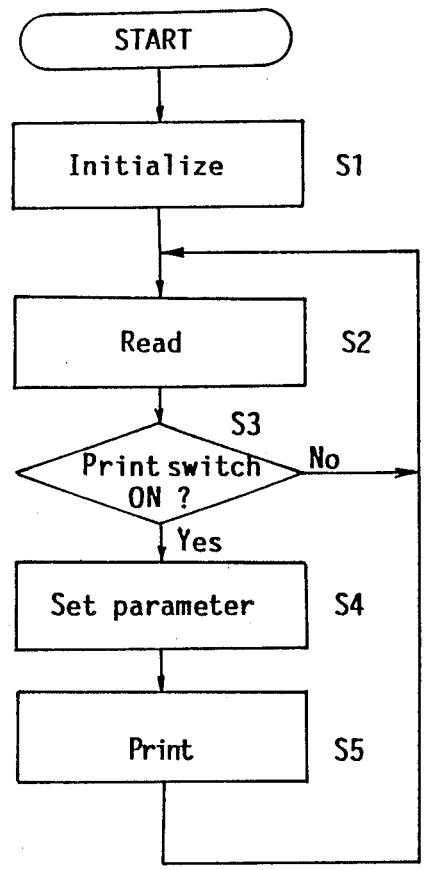
FIGS. 12 through 15 are flowcharts illustrating operation of the reader-printer.

FIG. 12 is a flowchart showing an overall operation. After the power source is turned on and initialization is completed (step S1), the reading operation is carried out in the reader mode (step S2). Then, the program moves to step S3 at which the state of the print switch is judged (step S3). In the reading operation routine (step S2), as described above, the microimage I recorded on the microfilm F is projected onto the screen 5. When the print switch is turned on, print parameters are set on the basis of the state of the document mark selecting switch 2 and signals from the image size judging sensor $S_I$ (step S4).

Next, the program is changed over from the reader mode to the printer mode and the printing operation is carried out (step S5).

The control device C of this reader-printer includes a multi-task monitor for controlling a multiplicity of tasks to carry out allotted tasks of the printing operation. These tasks include scanning of the microimage I, paper feeding to the transferring device 20, temperature control of the heat-fixing device 22, checking of the operation switches, exposure control, toner control, detection of paper jam and so on. The multi-task monitor controls the multiplicity of tasks as if they were done in parallel. The above tasks are synchronized with each other when necessary by checking the state of flag, and so on.

The scanning task of the microimage I and the paper feeding task to the transferring device 20 will now be described.

Figure 13:
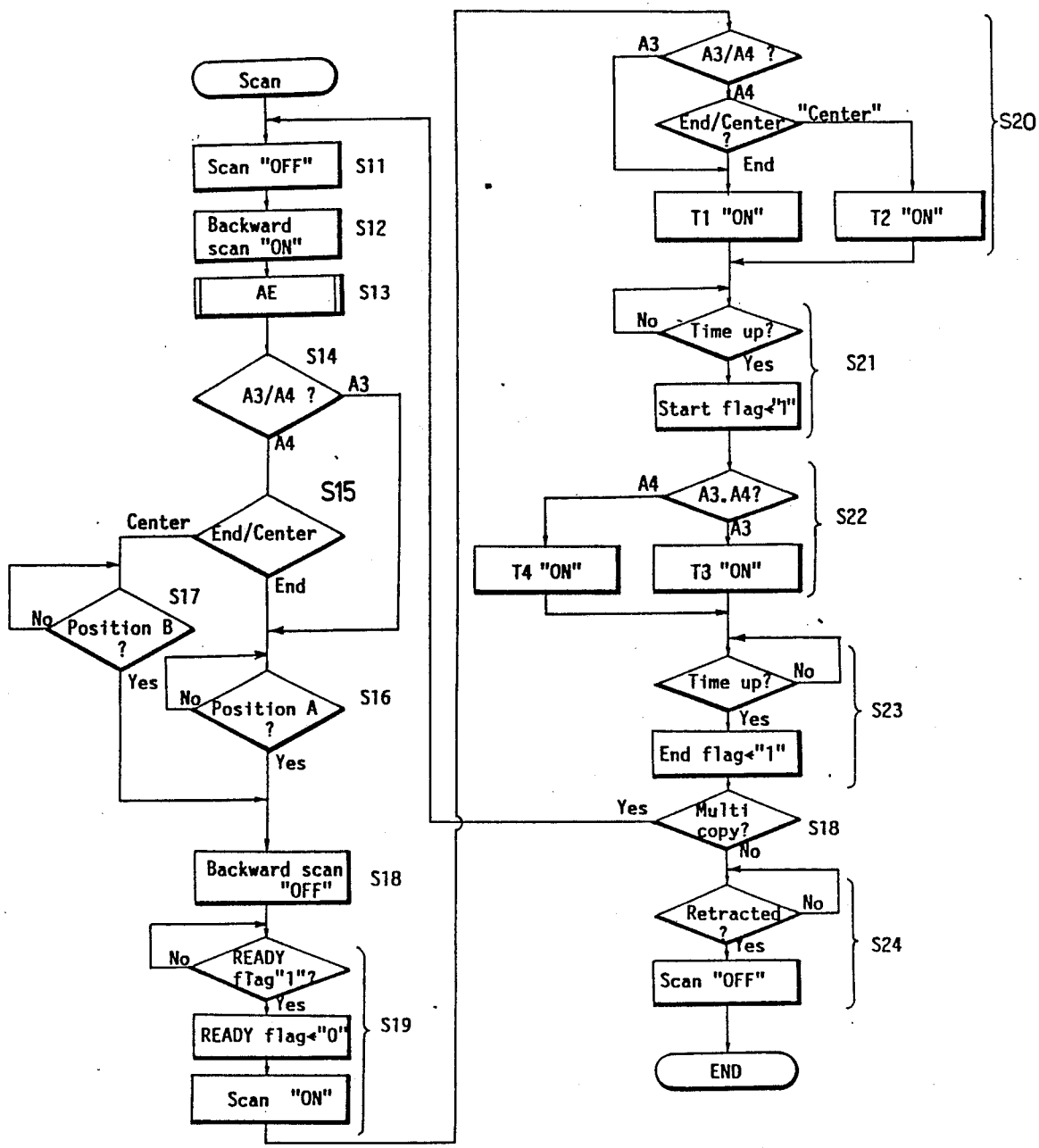
Figure 14:
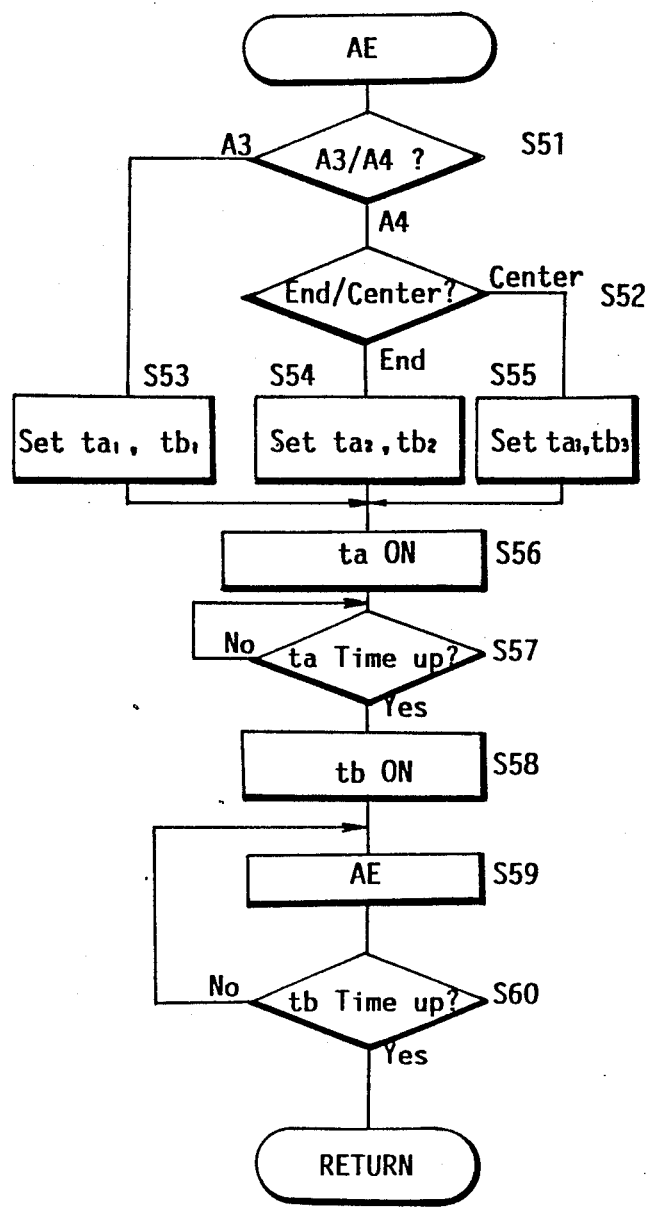

FIG. 13 is a flowchart illustrating the scanning task. In this task, first, the scanning operation is stopped (step S11). At this time, the projecting mirror 3 is retracted at the retracted position y and the scanning mirror 6 is at the retracted position x. Accordingly, the image size judging sensor $S_I$ disposed on the ceiling of the reader-printer is illuminated by the light having passed the microfilm, whereby the image size is judged through the circuit and CPU shown in FIG. 8. Then, the scanning mirror 6 starts to scan in the backward direction from the retracted position x to the scan starting position and the scanning mirror 8 moves to the scan starting position p (step S12). During this backward scanning, AE photometry is carried out (step S13), as shown in FIG. 14. At step S51, the image size is judged by the image size judging operation. When the image is of A3 size, the set times ta1 and tb1 are set (step S53). When the image is of A4 size, step S52 judges whether the image is positioned at the center as shown in FIG. 4b or is positioned at the end as shown in FIG. 4c. When the image is positioned at the end, the set times ta2 and tb2 are set at step S54, and when the image is positioned at the center, the set times ta3 and tb3 are set at step S55. These set times ta1–ta3 and tb1–tb3 are for determining the AE photometric area explained in FIG. 9.

After the required set times are set, the set time ta1, ta2 or ta3 is started (step S56). When the set time is up (Step S57), the set time tb1, tb2 or tb3 is started (step S58) to effect the AE photometry while the scanning mirror is passing through the photometric area. When the set time tb1, tb2 or tb3 is up (step S60), the photometry is completed.

After the completion of the AE photometry, step S16 or S17 selects which scan starting position sensor A or B is to be activated, depending on the result of the image size judging and on the position of the microimage (step S14, step S15). When the activated scan starting position sensor detects the scanning mirrors 6 and 8, the backward scanning operation is started (step S18). Thereafter, it is judged whether or not the recording paper is fed to the timing roller 18 by the state of the paper READY flag. When the flag is set to "1", the paper feeding is judged to be ready. Then, the flag is cleared and the scanning operation is started (step S19).

Thereafter, the built-in timer T1 or T2 is started in accordance with the preset print parameters. The timer T2 is started when the image is judged to be of A4 size by means of the image size judging sensor and to correspond to the first method wherein the document mark M is recorded at the center by means of the document mark selecting switch 2. The timer T1 is started when the image is judged to be of A4 size and to correspond to the second method wherein the document mark M is recorded at the leading end, and when the image is judged to be of A3 size (step S20).

When the set time of the timer T1 or T2 is up, the scanning mirrors 6 and 8 are judged to have reached the leading end of the microimage I and the image-forming starting flag is set to "1" to notify the paper feeding task of that effect (step S21). Thus, the paper feeding task feeds the recording paper to the transferring device 20.

Next, the timer T3 or T4 is started in accordance with the print parameters. When the image is judged to be of A3 size, the timer T3 is started, and when the image is judged to be of A4 size, the timer T4 is started (step S22). Then, the microimage I is slit-exposed to form the electrostatic latent image on the photosensitive drum 19. When the set time of the timer T3 or T4 is up, the image formation is judged to have been completed and the image-forming end flag is set to "1" to notify the paper feeding task of that effect (step S23).

Step S18 judges whether or not multi-copying is required. This judgment is made by checking the state of the flag which varies in accordance with the result obtained by comparing the designated number of copies with the calculated number of copies by means of another task. If the copying operation should be continued, the program returns to step S11 and carries out the same operation as above. If the multi-copying operation is not necessary, the scanning mirror 6 continues moving in the same direction. When the scanning mirror 6 is detected by the scan retracted position sensor (not shown), the scanning operation is stopped (step S24) to complete the scanning task.

Figure 15:
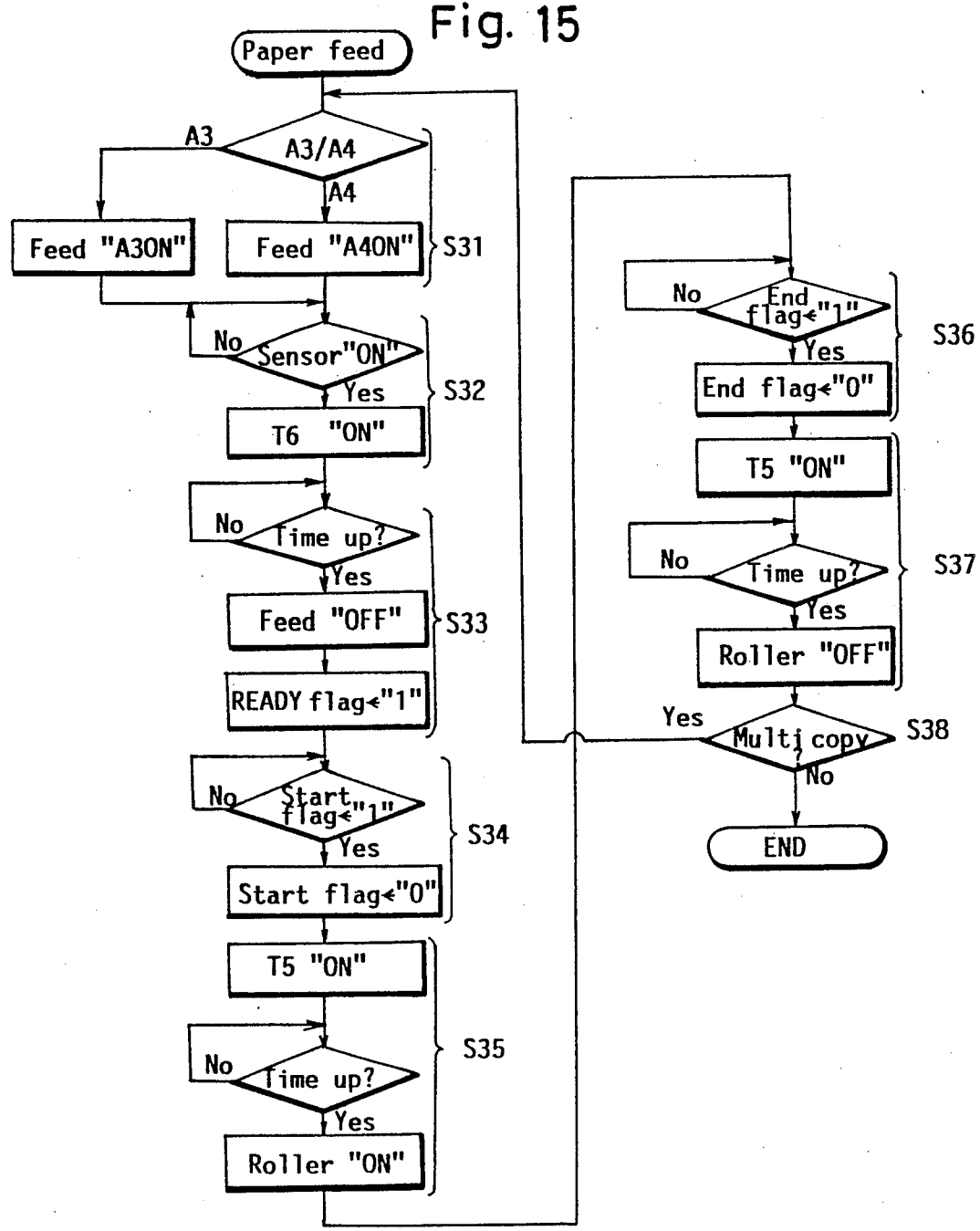

FIG. 15 is a flowchart illustrating the paper feeding task. In this task, one recording paper having a size corresponding to the result obtained by the image size judging sensor $S_I$ is fed from the paper feeding cassette 10 or 11 by driving the pickup roller 12 or 13 and is transported to the timing roller 18 by the rollers 14, 16 or 15, 16 (step S31). When the recording paper detecting sensor 17 detects the leading end of the recording paper, the timer T6 is started (step S32). The set time of the timer T6 is set to be up after the recording paper is transported in the distance required to form a loop. When the set time of the timer T6 is up, the driving of all the rollers is stopped and the paper READY flag is set to "1" to notify the scanning task of that effect (step S33).

Whether or not the scanning mirrors 6 and 8 have reached the leading end of the microimage I is judged by the state of the image-forming starting flag. When the image-forming starting flag is set to "1", scanning of the microimage I is judged to have been started and the flag is cleared (step S34). Then, the time lag between the scan starting and the recording paper feeding is adjusted and the timer T5 is started to allow the leading end of the recording paper to be positioned correctly for transferring the image formed on the photosensitive drum 19. When the set time of the timer T5 is up, the timing roller 18 is driven to transport the recording paper to the transferring device 20 (step S35).

The latent image on the photosensitive drum 19 is developed and transferred onto the recording paper. Meanwhile, whether or not the image-forming has been completed is judged by the state of the image-forming end flag. When the flag is set to "1", the operation is judged to have been completed and the flag is cleared (step S36). Subsequently, the timer T5 for adjusting the time lag is started again and after the set time of this timer is up, the driving of the timing roller 18 is stopped (step S37).

As in the case of the scanning task, it is judged whether multi-copying is necessary or not (step S38) and, if necessary, the program returns to step S31 and repeats the same operation as above. If the copying operation is to be discontinued, the paper feeding task is completed.

In the above embodiment, images of two sizes (i.e., A3 size and A4 size) are recorded on the microfilm F. However, the originals may be of B4 size and B5 size, or of A4 size and B5 size.

The present invention is applicable to the case where the width of the blank portion varies in accordance with the image size. If a single sensor having a large detection area is employed, the quantity of light received by the sensor varies with the width of the blank portion. This leads to the ununiformity of output power and causes difficulty in the judgment owing to little difference between the output of the blank portion and that of the image. According to the present invention, since a plurality of sensors are arranged in the transport direction of the blank portion, at least one sensor detects the blank portion, thereby solving the above problem.

In the above embodiment, the microfilm F comprises a long roll film. The present invention is not limited to this and may be applied to a microfiche or a film contained in a jacket.

In the above embodiment, the image size judgment is made for two sizes, A4 size and A3 size. If two pairs of image size judging sensors are provided at an appropriate interval, the judgment may be made for three sizes, for example, A4 size, B4 size and A3 size.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A reader-printer capable of being changed over between a reader mode in which an image on a microfilm is projected on a screen and a printer mode in which the image is printed on a recording paper, said reader-printer comprising:
   a plurality of paper feeding sections, each accommodating a recording paper of a different size;
   retrieval means for retrieving a desired image out of a multiplicity of images recorded on a microfilm;
   a plurality of sensors arranged in a line along a film transport direction for judging a frame size of the retrieved image, said plurality of sensors being disposed in a position where all the sensors receive light having passed through an image area when an image at an exposure position has a first size, and where at least one sensor receives light having passed through an area including a blank portion between images when the image has a second size, each of said sensors having the same or less width than a width of said blank portion projected onto the sensor and being so arranged that an arrangement pitch thereof is the same or less than said width of said blank portion;
   distinguishing means for distinguishing signals of levels corresponding to the blank portion from signals of other levels, both of said signals being generated by said plurality of sensors; and
   control means for judging a size of the retrieved image frame using a result of the distinguishing means an selecting a paper feeding section out of said plurality of paper feeding sections in accordance with a result of the judgment.

2. A reader-printer as claimed in claim 1, wherein each sensor has the same or less width than a half of the width of said blank portion projected onto the sensor.

3. A reader-printer as claimed in claim 1, wherein the arrangement pitch of each sensor is the same or less than a half to he width of said blank portion projected onto the sensor.

4. A reader-printer as claimed in claim 1, wherein said reader-printer has a plurality of transverse rows of sensors.

5. A reader-printer capable of being changer over between a reader mode in which an image on a microfilm is projected on a screen and a printer mode in which the image is printed on a recording paper, said reader-printer comprising:
   a plurality of paper feeding sections, each accommodating a recording paper of a different size;
   retrieval mean for retrieving a desired image out of a multiplicity of images recorded on a microfilm;
   scanning means for scanning the retrieved image for printing it on a recording paper while moving from a scan start position to a scan end position in the printer mode, said scanning means being positioned at a reader mode position in the reader mode;
   mode changing means for effecting a change-over operation from the reader mode to the printer mode so that said scanning means is moved rom the reader mode position to the scan start position;
   sensor means positioned out of a reader optical path through which light from the microfilm travels in the reader mode and out of a printer optical path through which the light travels in the printer mode but to receive the light during the change-over operation;

judgment means responsive to said sensor means for judging a fame size of the retrieved image during said change-over operation; and control means responsive to said judgment means for selecting a suitable paper feeding section out of said plurality of paper feeding sections and for initiating a paper feeding operation before said scanning means reaches the scan start position.

6. A reader-printer capable of being changed over between a reader mode in which an image on a microfilm is projected on a screen and a printer mode in which the image is printed on a recording paper, said reader-printer comprising:

a plurality of paper feeding sections, each accommodating a recording paper of a different size;

retrieval means for retrieving a desired image out of a multiplicity of images recorded on a microfilm;

scanning means for scanning the retrieved image for printing it on a recording paper while moving from a scan start position to a scan end position in the printer mode, said scanning means being positioned at a reader mode position in the reader mode;

mode changing means for effecting a change-over operation from the reader mode to the printer mode so that said scanning means is moved from the reader mode position to the scan start position;

a plurality of sensors arranged in a line along a film transport direction for judging a frame size of the retrieved image, said plurality of sensors being disposed out of a reader optical path through which light from the microfilm travels in the reader mode and ut of a printer optical path through which the light travels in the printer mode but to receive light during the change-over operation, said light passing through an image area when an image at an exposure position has a first size, and passing though an area including a blank portion between images when the image has a second size;

distinguishing means for distinguishing signals of levels corresponding to the blank portion from signals of other levels, both of said signals being generated by said plurality of sensors; and control means for judging a size of the retrieved image frame using a result of the distinguishing means, selecting a paper feeding section out of said plurality of paper feeding sections in accordance with a result of the judgment, and initiating a paper feeding operation before said scanning means reaches the scan start position.

7. An apparatus for handling a microfilm, comprising:
retrieval means for retrieving a desired image out of a multiplicity of images recorded on a microfilm;
a plurality of sensors arranged in a line along a film transport direction, said plurality of sensors being disposed in a position where all the sensors receive light having passed through an image area when an image at an exposure position has a first size, and where at least one sensor receives light having passed through an are including a blank portion between images when the image has a second size, each of said sensors having the same or less width than a width of said blank portion projected onto the sensor and being so arranged that an arrangement pitch thereof is the same or less than said width of said blank portion;

distinguishing means for distinguishing signals of levels corresponding to the blank portion from signals of other levels, both of said signals being generated by said plurality of sensors; and control means for judging a size of the retrieved image frame using a result of the distinguishing means.

8. An apparatus as claimed in claim 7, wherein each sensor has the same or less width than a half of the width of said blank portion projected onto the sensor.

9. An apparatus as claimed in claim 7, wherein the arrangement pitch of each sensor is the same or less than a half of the width of said blank portion projected onto the sensor.

10. An apparatus as claimed in claim 7, wherein said apparatus has a plurality of transverse rows of sensors.

11. A method of detecting a size of an image recorded on a microfilm in an apparatus for handling the microfilm on which a multiplicity of images are recorded, the steps comprising:

providing a plurality of sensors arranged in a line along a film transport direction and disposed in a position where all the sensors receive light having passed through an image area when an image at an exposure position has a first size and where at least one sensor receives light having passed through an area including a blank portion between images when the image has a second size, each of said sensors having he same or less width than a width of said blank portion projected onto the sensor and being so arranged that an arrangement pitch thereof is the same or less than said width of said blank portion;

positioning a desired image out of said multiplicity of images recorded on a microfilm at said exposure position;

distinguishing signals of levels corresponding to the blank portion from signals of other levels, both of said signals being generated by said plurality of sensors; and judging a size of said desired image using a result of the distinguishment.

12. A method of controlling a reader-printer capable of being changed over between a reader mode in which an image on a microfilm is projected on a screen by using a reader optical path and a printer mode in which the image is printed on a recording paper by using a printer optical path, the reader-printer having a plurality of paper feeding sections each accommodating a recording paper of a different size and a scanning optical system for scanning the image for printing it on the recording paper in the printer mode, the method comprising the steps of:

providing a sensor disposed out of said reader and printer optical paths but to receive light from the microfilm during a change-over operation from the reader mode to the printer mode;

initiating to move the scanning optical system toward a scan start position in response to a print start instruction;

receiving light from the microfilm by the sensor;

judging a frame size of the image in response to output of the sensor;

selecting a suitable paper feeding section out of the plurality of paper feeding sections in response to the judgment and initiating a paper feeding operation; and moving the scanning optical system from the scan start position to a scan end position for scanning the image, wherein said receiving, judging and selecting steps are executed before the scanning optical system reaches the scan start position after the print start instruction is issued.

* * * * *

UNITED STATES PATENT AND TRADEMARK OFFICE
CERTIFICATE OF CORRECTION

PATENT NO. : 4,931,828

DATED : June 5, 1990

INVENTOR(S) : Masafumi Fujita, Takao Saijo and Kazuhiko Tezuka

It is certified that error appears in the above-identified patent and that said Letters Patent is hereby corrected as shown below:

In col. 3, line 11, delete "the" (second occurrence).

In col. 3, line 12, before "signals", insert --the--.

In col. 3, lines 62 and 63, change "operation" to --operations--.

In col. 4, line 24, after "positions", insert --$\ell$--.

In col. 6, line 44, change "right" to --light--.

In col. 6, line 51, change "row" to --rows--.

In col. 6, line 52, change "right" to --light--.

In col. 7, line 27, after "quantity", insert --differences--.

In col. 8, line 3, change "p" (first occurrence) to --$\ell$--.

In col. 8, line 19, change "p" to --$\ell$--.

In col. 8, line 36, after "positions", insert --$\ell$--.

In col. 8, line 46, after "positions", insert --$\ell$--.

UNITED STATES PATENT AND TRADEMARK OFFICE
CERTIFICATE OF CORRECTION

PATENT NO. : 4,931,828

DATED : June 5, 1990

INVENTOR(S) : Masafumi Fujita, et al

It is certified that error appears in the above-identified patent and that said Letters Patent is hereby corrected as shown below:

In col. 8, last line, change "p" (first occurrence) to --$\ell$--.

In col. 12, claim 1, line 35, change "an" to --and--.

In col. 12, claim 3, line 43, change "to he" to --of the--.

In col. 12, claim 5, line 48, change "changer" to --changed--.

In col. 12, claim 5, line 55, change "mean" to --means--.

In col. 12, claim 5, line 57, move the line to the left to indicate the beginning of a new paragraph.

In col. 12, claim 5, line 65, change "rom" to --from--.

In col. 13, claim 5, line 6, change "fame" to --frame--.

In col. 13, claim 6, line 36, change "ut" to --out--.

In col. 13, claim 6, line 41, change "though" to --through--.

In col. 13, claim 7, line 64, change "are" to --area--.

In col. 14, claim 11, line 31, change "he" to --the--.

Signed and Sealed this

Twenty-fourth Day of September, 1991

*Attest:*

HARRY F. MANBECK, JR.

*Attesting Officer*          *Commissioner of Patents and Trademarks*